United States Patent
Andre

(10) Patent No.: US 10,109,333 B2
(45) Date of Patent: Oct. 23, 2018

(54) NONVOLATILE LOGIC AND SECURITY CIRCUITS

(71) Applicant: EVERSPIN TECHNOLOGIES, INC., Chandler, AZ (US)

(72) Inventor: Thomas Andre, Austin, TX (US)

(73) Assignee: Everspin Technologies, Inc., Chandler, AZ (US)

( * ) Notice: Subject to any disclaimer, the term of this patent is extended or adjusted under 35 U.S.C. 154(b) by 0 days.

(21) Appl. No.: 15/672,469

(22) Filed: Aug. 9, 2017

(65) Prior Publication Data

US 2017/0337959 A1 Nov. 23, 2017

Related U.S. Application Data

(60) Continuation of application No. 15/149,826, filed on May 9, 2016, now Pat. No. 9,754,652, which is a (Continued)

(51) Int. Cl.
*G11C 13/00* (2006.01)
*G11C 5/06* (2006.01)
(Continued)

(52) U.S. Cl.
CPC ...... *G11C 11/1673* (2013.01); *G06F 11/1068* (2013.01); *G11C 11/1675* (2013.01);
(Continued)

(58) Field of Classification Search
CPC ............ G11C 11/1673; G11C 11/1675; G11C 13/004; G11C 13/0069; G11C 29/52; G11C 5/06; G11C 13/0002; G11C 13/0026; G11C 13/003; G11C 2213/75; G11C 2213/77; G06F 11/1068; H01L 27/228; H01L 43/02; H01L 43/08
(Continued)

(56) References Cited

U.S. PATENT DOCUMENTS 5,029,132 A 7/1991 Arakawa
5,280,449 A 1/1994 Oldham
(Continued)

FOREIGN PATENT DOCUMENTS

CN 103460065 A 12/2013
WO WO 2015/035053 A1 3/2015

OTHER PUBLICATIONS

Office Action for U.S. Appl. No. 14/495,678, dated Oct. 2, 2015, Thomas Andre, "Nonvolatile Logic and Security Circuits", 6 pages.
(Continued)

*Primary Examiner* — Ly D Pham
(74) *Attorney, Agent, or Firm* — Bookoff McAndrews, PLLC

(57) ABSTRACT

In some examples, a nonvolatile storage element may be configured to store a state or value during a low power or powered down period of a circuit. For example, the nonvolatile storage element may include a bridge of resistive elements that have a resistive state that may be configured by applying voltages to multiple drive paths. A sense amplifier may be connected to the bridge in order to resolve a voltage differential associated with the bridge to ether power or ground and, thereby determine the state associated with on the nonvolatile storage element.

11 Claims, 10 Drawing Sheets

Related U.S. Application Data division of application No. 14/495,678, filed on Sep. 24, 2014, now Pat. No. 9,336,872.

(60) Provisional application No. 61/951,002, filed on Mar. 11, 2014.

(51) Int. Cl.

| | | |
|---|---|---|
| *G11C 11/56* | (2006.01) | |
| *G11C 11/419* | (2006.01) | |
| *G11C 11/16* | (2006.01) | |
| *G06F 11/10* | (2006.01) | |
| *H01L 43/08* | (2006.01) | |
| *H01L 43/02* | (2006.01) | |
| *H01L 27/22* | (2006.01) | |
| *G11C 29/52* | (2006.01) | |

(52) U.S. Cl.
CPC ........ *G11C 13/004* (2013.01); *G11C 13/0069* (2013.01); *G11C 29/52* (2013.01); *H01L 27/228* (2013.01); *H01L 43/02* (2013.01); *H01L 43/08* (2013.01); *G11C 5/06* (2013.01); *G11C 13/0002* (2013.01); *G11C 13/003* (2013.01); *G11C 13/0026* (2013.01); *G11C 2213/75* (2013.01); *G11C 2213/77* (2013.01)

(58) Field of Classification Search
USPC ........................................ 365/148
See application file for complete search history.

(56) References Cited

U.S. PATENT DOCUMENTS

| | | |
|---|---|---|
| 5,619,470 A | 4/1997 | Fukumuto |
| 6,114,719 A | 9/2000 | Dill et al. |
| 6,469,930 B1 | 10/2002 | Murray |
| 6,947,318 B1 | 9/2005 | Fujita |
| 7,724,566 B1 | 5/2010 | Sundstrom |
| 2010/0073991 A1 | 3/2010 | Yamada et al. |
| 2010/0073992 A1 | 3/2010 | Ueda |
| 2010/0296330 A1 | 11/2010 | Kotaki et al. |
| 2011/0026305 A1 | 2/2011 | Reed et al. |
| 2011/0280073 A1 | 11/2011 | Chiu et al. |
| 2011/0297912 A1 | 12/2011 | Samachisa et al. |
| 2012/0026783 A1 | 2/2012 | Jung et al. |
| 2013/0028012 A1 | 1/2013 | Fujita et al. |
| 2014/0050022 A1 | 2/2014 | Taylor et al. |
| 2014/0063888 A1 | 3/2014 | Lee et al. |
| 2014/0138609 A1 | 5/2014 | Satoh et al. |
| 2014/0177318 A1 | 6/2014 | Ting et al. |
| 2014/0293685 A1 | 10/2014 | Noguchi et al. |
| 2015/0036412 A1 | 2/2015 | Kim |
| 2015/0131383 A1 | 5/2015 | Akerib et al. |
| 2015/0262662 A1 | 9/2015 | Andre |
| 2016/0254041 A1 | 5/2016 | Andre |
| 2016/0172035 A1 | 6/2016 | Roy et al. |

OTHER PUBLICATIONS

PCT Search Report and Written Opinion dated Jul. 27, 2015 for PCT Application No. PCT/US15/19659, 11 pages.
Supplemental European Search Report and Written Opinion dated Oct. 26, 2017 in corresponding EP Application No. 15761760, 15 pages.
Chinese Office Action in corresponding Chinese Application No. 201580012910.4, dated Jan. 29, 2018 (21 pages).

NONVOLATILE LOGIC AND SECURITY CIRCUITS

CROSS REFERENCE TO RELATED APPLICATION

This application is a continuation application of pending U.S. application Ser. No. 15/149,826, filed May 9, 2016, which is a divisional of prior U.S. patent application Ser. No. 14/495,678, filed Sep. 24, 2014 (now U.S. Pat. No. 9,336, 872, issued on May 10, 2016), which claims the benefit of priority to U.S. Provisional Patent Application No. 61/951, 002 filed Mar. 11, 2014, each of which is incorporated herein by reference in its entirety.

BACKGROUND

Circuits typically experience a static current draw when power is applied due to leakage. However, powering a circuit down may be problematic as the circuitry is unable to retain the current state upon power up without lengthily power up or initialization sequences because the latch elements are typically volatile storage elements and disabling power would cause the loss of the state stored on the latch.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
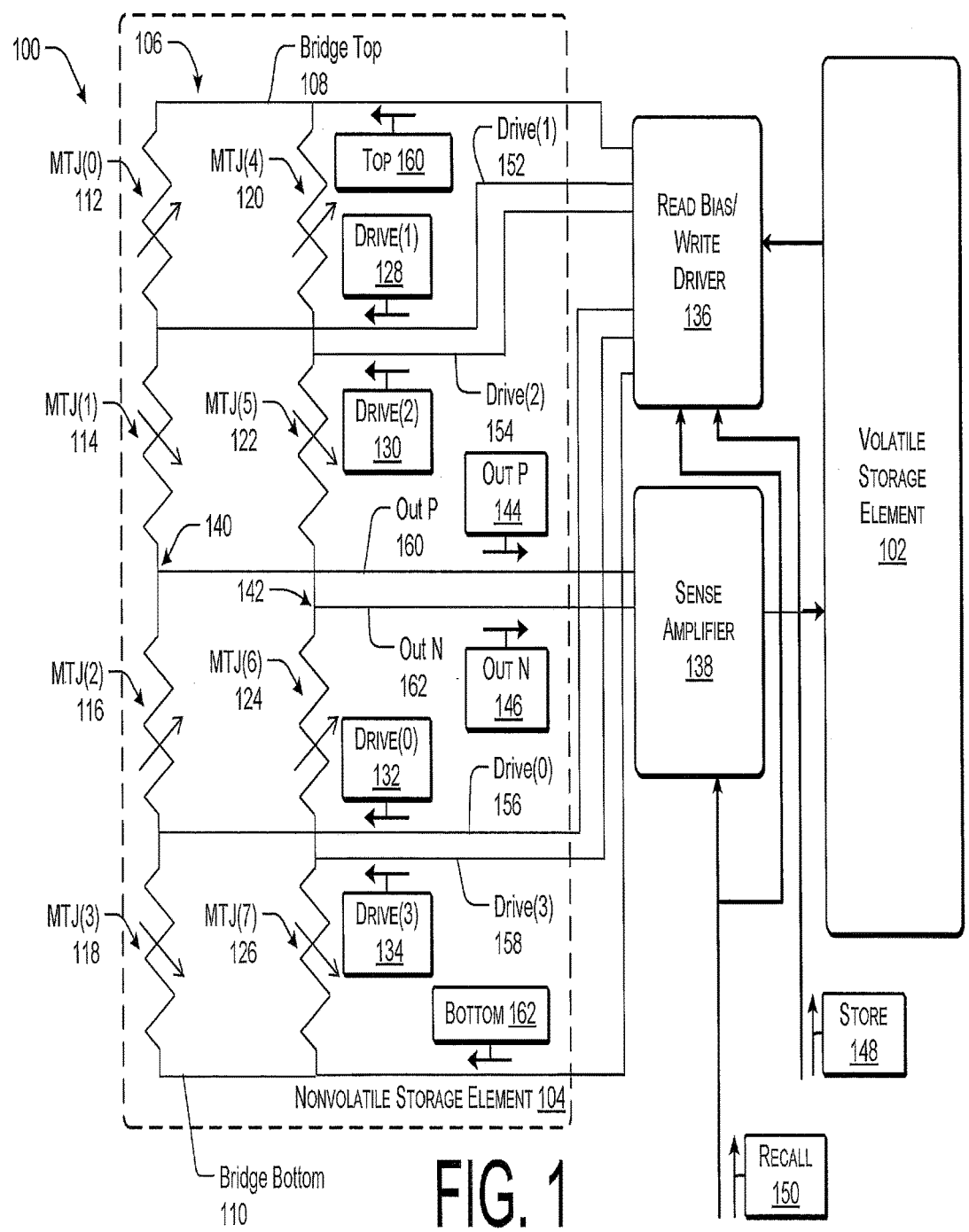
FIG. 1 illustrates a partial logic diagram and partial circuit diagram showing select components of circuit for maintaining a state through a power off period according to some implementations.

This disclosure includes techniques and implementations to implement a nonvolatile storage element. In some examples, the magnetic random access memories (MRAMs) or spin torque MRAM (ST-MRAM) elements may be utilized to generate nonvolatile storage elements, such as nonvolatile flip flop, logic gate, or other circuit components for maintain a state associated with a circuit while a device or portion of a device is powered off. For instance, in some implementations, the nonvolatile storage elements described herein may utilize magnetic orientation opposed to a charge state to maintain a value.

In one implementation, a nonvolatile storage element may include a plurality of restive elements or magnetic tunnel junctions (MTJs) arranged as a bridge having a pair of midpoints with pairs of MTJs positioned both above and below each of the midpoints. In some implementations, the number of pairs of MTJs above each midpoint and below each midpoint are equal. The nonvolatile flip flop also includes a read bias/write driver circuit connected to the bridge and configured to generate drive signals to cause the pairs of MTJs to be driven high or low, such that a value or state may be stored on the bridge.

For instance, in one particular implementation, the bridge includes two pairs (or four) MTJs above the midpoints and two pairs (or four) MTJs below the midpoints. In this implementation, the read bias/write driver circuit connected to the bridge and configured to generate four drive signals (e.g., two above the midpoints and two below the midpoints) to cause the pairs of MTJs to be driven high and/or low, such that a particular voltage differential associated with the midpoints of the bridge and thereby a state associated with the particular voltage differential may be stored.

In some implementations, described herein, the nonvolatile storage element is connected to a sense amplifier that is configured to receive an output value associated with the MTJs and to determine the state of the bridge based on a differential associated with the output values and thereby a value stored on the bridge. For instance, the bridge may include a first midpoint voltage associated with a first column of the bridge and a second midpoint voltage associated with the second column of the bridge and the sense amplifier may determine the value of the bridge based on a comparison between the first midpoint voltage and the second midpoint voltage.

In another particular implementation, the bridge includes four pairs (or eight) MTJs above the midpoints and four pairs (or eight) MTJs below the midpoints. In this implementation, the read bias/write driver circuit connected to the bridge and configured to generate eight drive signals (e.g., four above the midpoints and four below the midpoints) to cause the pairs of MTJs to be driven high and/or low, such that a first voltage differential may be associated with the lower half of the bridge and a second voltage differential may be associated with the upper half of the bridge.

In this implementation, a sense amplifier may be able to determine the state associated with the bridge and the value stored on the nonvolatile storage element based on the first and second voltage differentials. For instance, the state may be determined based in part on voltages associated with the upper half of the first column, the lower half of the first column, the upper half of the second column, and the lower half of the second column.

In some implementations, due to the fact that the stored magnetic orientations associated with the nonvolatile storage elements are difficult to detect, the nonvolatile storage elements may be utilized to generate one or more security codes or keys for a device, such as a device specific fingerprint. For instance, in some implementations, multiple nonvolatile storage elements may be used to create individual digits of a physical unclonable function (PUF) that may be used as a signature or fingerprint unique to each device. Since each digit of the PUF signature is based on a nature variation in the resistance of each state of the magnetic storage elements (e.g., the MTJs) associated with the nonvolatile storage elements, the signatures are not easily identified or duplicated. In some specific implementations, an error correction code (ECC) circuit may be used in conjunction with the PUF circuit to improve the consistency of the output response and, thereby, the overall reliability of the PUF circuit.

FIG. 1 illustrates a block diagram showing select components of circuit 100 for maintaining a state through a power off period according to some implementations. In the illustrated example, the circuit 100 includes a volatile storage element 102 and a nonvolatile storage element 104. In general, the volatile storage element 102 may be employed to store a state or data associated with the circuit 100, while the circuit 100 is powered on. However, in some implementations, the volatile storage element 102 may be unable to maintain the data or the state in response to the circuit 100 being powered down. Accordingly, in the event that power to the circuit 100 is reduced, such as when the circuit 100 is transitioned from an active state to a low power state or an off state, the nonvolatile storage element 104 is capable of reading a value or a state associated with the volatile storage element 102 and maintaining the value and/or the state until the power to the circuit 100 is reestablished.

The nonvolatile storage element 104 may include a bridge, generally indicate by 106, having a bridge top 108 and a bridge bottom 110. The bridge 106 may be formed from multiple resistive elements, such as tunnel junctions or MTJs, arranged in two columns. For instance, in the illustrated example, the bridge 106 includes a first column of MTJs 112-118 and a second column of MTJs 120-126. In the illustrated example, the MTJs 112-126 are arranged such that four of the MTJs 112, 114, 120 and 122 are arranged above a pair of midpoints associated with the bridge 106 and four MTJs 116, 118, 124, and 126 are arranged below the midpoints. By arranging the MTJs 112-126 in this manner, a value (e.g., one or zero) may be determined from the voltage differential associated with the midpoints of the bridge.

Each of the MTJs 112-126 may be driven to a high state or a low state and the state of each of the respective MTJs 112-126 may be based on a relative magnetic spin associated with the magnetic layers of the MTJs 112-126. In some implementations, the magnetic spin associated with the MTJs 112-126 may be set by applying voltages or drive signals 128-134 to the MTJs 112-126 of the bridge 106. In some cases, the state of the MTJs 112-126 may be set to produce one or more particular arrangements on the bridge 106. Each of the particular arrangements result in a particular voltage differential associated with the midpoints of the bridge 106. For instance, in one particular arrangement, a voltage associated with the midpoint of the first column of the bridge 106 may be greater than a voltage associated with the midpoint of the second column of the bridge 106. In another particular arrangement, the voltage associated with the midpoint of the first column of the bridge 106 may be less than a voltage associated with the midpoint of the second column of the bridge 106

In general, the volatile storage element 102 has a state or value (e.g., zero or one) while the circuit 100 is powered on. In response to the circuit 100 being powered down or placed in a low power state, for instance, to conserve power when the circuit is not in use by the electronic device, the a read bias/write driver 136 may receive a store signal 148 and the state of the volatile storage element 102. Depending on the state, the read bias/write driver 136 provides the drive signals 128-130 to the bridge 106 to set the state of the MTJs 112-126.

For example, when the value to be stored by the nonvolatile storage element 104 is a zero, the read bias/write driver 136 may drive signal 128 high along drive path 152, drive signal 130 low along drive path 154, drive signal 132 low along drive path 156, and drive signal 134 high along drive path 158. In this example, the drive signals 128 and 130 cause the MTJ 112 to a high state and MTJ 120 to a low state, the drive signals 130 and 134 caused the MTJ 122 to a low state and MTJ 124 to a high state, the drive signals 132 and 134 cause MTJ 118 to a low state and MTJ 126 to a high state, and the signals 128 and 132 caused the MTJ 114 to a high state and MTJ 116 to a low state. Alternatively, when the value to be stored by the nonvolatile storage element 104 is a one, the read bias/write driver 136 may cause drive signal 128 low along drive path 152, drive signal 130 high along drive path 154, drive signal 132 high along drive path 156, and drive signal 134 low along drive path 158. In this example, the drive signals 128 and 130 cause the MTJ 112 to a low state and MTJ 120 to a high state, that drive signals 130 and 134 cause the MTJ 122 to a high state and MTJ 124 to a low state, the drive signals 132 and 134 cause MTJ 118 to a high state and MTJ 126 to a low state, and the drive signals 128 and 132 cause the MTJ 114 to a low state and MTJ 116 to a high state.

In this example, by setting the MTJs 112-126 in the arrangements described above, a value (e.g., high or low corresponding to zero or one), may be detected by reading a value associated with the midpoint, generally indicated by 140 and 142, of each column of the bridge 106. For instance, in the illustrated example, the bridge 106 has a first out path P 160 associated with the midpoint 140 of the first column and a second out path N 162 associated with the midpoint 142 of the second column. In general, the sense amplifier 138 may receive an out P signal 144 associated with the first column and an out N signal 146 associated with the second column.

When power is restored to the volatile storage element 102, the sense amplifier 138 and the read bias/write driver 136 receive the recall signal 150, and in response, the read bias/write driver 136 biases the bridge top 108 and the bridge bottom 110. Once, the bridge top 108 and the bridge bottom 110 are biased, the sense amplifier 138 is able to detect a differential voltage associated with the out signals 144 and 146. The sense amplifier 138 is then able to determine a state associated with the nonvolatile storage element 104 based on the differential voltage. For example, when reading the value stored on the bridge 106, the read bias/write driver 136 bias the bridge top 108 by generating a top signal 160 and the bridge bottom 110 by generating a bottom signal 162. In response, a voltage may be detected at midpoints 140 and 142 as part of out signals 144 and 146 by the sense amplifier 138. The sense amplifier 138 may determine the value (e.g., either a zero or one), as will be described in more detail below with respect to FIG. 3, based in part on which of out signal 144 or out signal 146 has a greater voltage.

For instance, the sense amplifier 138 includes a pair of cross coupled devices (not shown) that are able to resolve the voltage differential between the out signals 144 and 146 to either power or ground and, thereby produce a digital output that may be provided back to the volatile storage element 102. Thus, in one particular example, if the MTJs have a resistance of two when in a high state and one when in a low state and the value to be stored is a zero, the MTJs 112, 114, 124 and 126 have a resistance of two and the MTJs 116, 118, 120, and 122 have a value of one. When the bridge top 108 and the bridge bottom 110 are biased by the read bias/write driver 136 to VDD, the midpoint 140 has a value of $0.3\overline{3}$ times VSS and the midpoint 142 has a value of $0.6\overline{6}$ times VDD. The values on each midpoint 140 and 142 may be detected by the sense amplifier 138 and, since midpoint 142 has a higher voltage than the midpoint 140, the cross coupled device may cause the voltages to resolve towards ground. In response to identifying that the voltages are being resolved towards ground, the sense amplifier 138 is able to provide the value of zero back to the volatile storage element 102.

Likewise, in another particular example, if the MTJs have a resistance of two when in a high state and one when in a low state and the value to be stored is a one, then the MTJs 112, 114, 124 and 126 have a resistance of one and the MTJs 116, 118, 120, and 122 have a value of two. When the bridge top 108 and the bridge bottom 110 are biased by the read bias/write driver 136 to VDD, the midpoint 140 has a value of 0.66 times VDD and the midpoint 142 has a value of 0.33 times VDD. The values on each midpoint 140 and 142 may be detected by the sense amplifier 138 and, since midpoint 140 has a higher value than the midpoint 142, the cross coupled device may cause the voltages to resolve towards VDD. In response to identifying that the voltages are being resolved towards VDD, the sense amplifier 138 is able to provide the value of one back to the volatile storage element 102.

In the present example, when the sense amplifier 138 resolves the voltage differential to ground a value of zero is detected and when the sense amplifier 138 resolves the voltage differential to power a value of one is detected. However, it should be understood that in other examples, the sense amplifier 138 may assign the value of zero to a voltage differential that resolves towards power and a value of one to a voltage differential that resolves towards ground.

In the present example, the bridge 106 includes eight MTJs 112-126. However, in some implementations, the number of resistive elements or MTJs associated with the bridge 106 are related to the number of MTJs required to distribute the voltages associated with the drive signals 128-132 between the MTJs without causing one or more of the values stored on the MTJs to be flipped or switched. For instance, a bridge including sixteen MTJs is described below with respect to FIG. 4.

Figure 2:
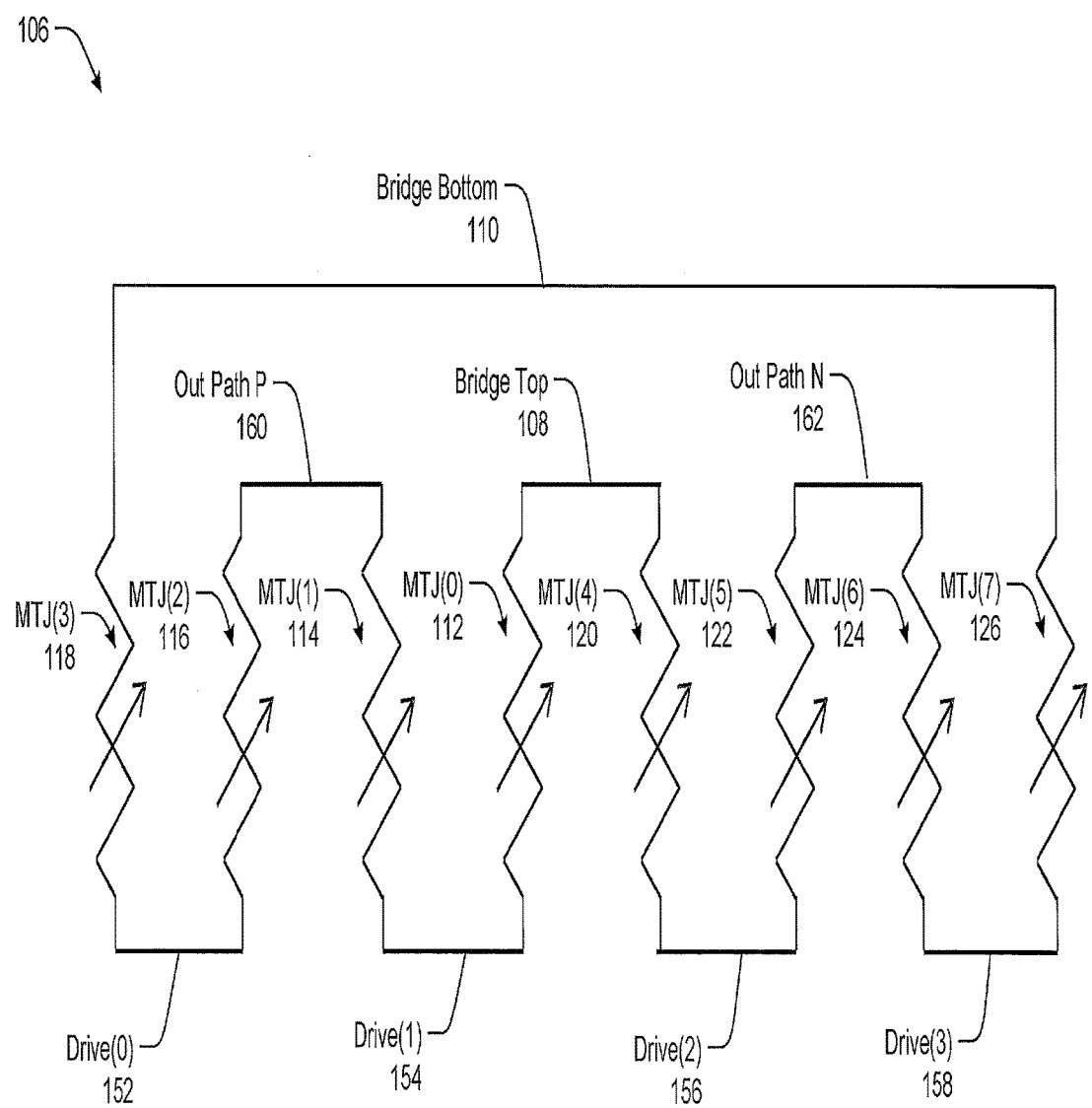
FIG. 2 illustrates a physical diagram showing select components of the bridge of FIG. 1 according to some implementations.

FIG. 2 illustrates a physical diagram showing select components of the bridge 106 of FIG. 1 according to some implementations. In the illustrated example, the MTJs 112-126 are shown along a metal layer or as part of a physical layout including the interconnections via the bridge top 108, the bridge bottom 110, drive 152-158, out path P 160, and out path N 162. For instance, the MTJ 118 and the MTJ 116 are connected via the drive path 152, the MTJ 116 and the MTJ 114 are connected via the out path P 160, the MTJ 114 and the MTJ 112 are connected via the drive path 154, the MTJ 112 and the MTJ 120 are connected via the bridge top 108, the MTJ 120 and the MTJ 122 are connected by the drive path 156, the MTJ 122 and the MTJ 124 are connected via the out path N 162, the MTJ 124 and the MTJ 126 are connected via the drive path 158, and the MTJ 126 and the MTJ 118 are connected via the bridge bottom 110.

In general, when a value of zero is to be stored by the bridge 106, a write driver, such as the read bias/write driver 136 of FIG. 1, causes the drive path 152 to be driven low and drive path 154 to be driven high resulting in the MTJ 116 being placed in a low state and MTJ 114 in the high state, the drive path 156 to be driven low with drive path 154 driven high resulting in the MTJ 120 being placed in a low state and MTJ 112 being placed in the high state, the drive path 158 to be driven high with drive path 156 driven low, resulting in the MTJ 124 being placed in a high state, and MTJ 122 being placed in the low state, and drive path 158 driven high with drive path 152 driven low results in the MTJ 126 being placed in the high state and MTJ 118 being placed in the low state. In other words, when the value of zero is to be stored by the bridge 106, the drive path 152 and the drive path 156 are driven low, and the drive path 154 and the drive path 158 are driven high thereby applying a down current along the MTJs 116, 118, 120, and 122 and an up current along the MTJs 112, 114, 124, and 126.

Likewise, when a value of one is to be stored by the bridge 106 the write driver causes the drive path 152 to be driven high and drive path 154 to be driven low resulting the MTJ 116 being placed in a high state and MTJ 114 being placed in the low state, the drive path 156 to be driven high with drive path 154 driven low resulting the MTJ 120 being placed in a high state and MTJ 112 being placed in the low state, the drive path 158 to be driven low with the drive path 156 driven high resulting the MTJ 124 being placed in a low state and MTJ 122 being placed in the high state, and drive path 158 driven low with drive path 152 driven high results in the MTJ 126 being placed in the low state and MTJ 118 being placed in the high state. In this way, the write driver is able to configure the MTJs 112-126 associated with the bridge 106 to maintain a value of either zero or one when power associated with the circuit is off. In other words, when the value of one is to be stored by the bridge 106, the drive path 152 and the drive path 156 are driven high, and the drive path 154 and the drive path 158 are driven low thereby applying an up current along the MTJs 116, 118, 120, and 122 and a down current along the MTJs 112, 114, 124, and 126.

In some implementations, by setting configuring the resistive state of the MTJs 112-126 by applying voltages to the drive paths 152-158 in the manner described above, the bridge 106 may be configured to store a value (e.g., one or zero) detectable by a sense amplifier, such as the sense amplifier describe below with respect to FIG. 3, when the bridge top 108 and the bridge bottom 110 are biased by a read bias component, such as read bias/write driver 136 of FIG. 1.

For instance, in the illustrated example, the read bias component may drive the bridge top 108 high and the bridge bottom 110 low associating a first voltage with the out path P 160 and a second voltage with the out path N 162 based on the resistive states of the MTJs 112-126, as configured in response to the write driver applying various voltages to the drive paths 152-158. In this instance, a first voltage may be detected on the out path P 160 and a second voltage may be detected on the out path N 162 by one or more sense amplifiers. The sense amplifier may determine the value stored on the bridge 106 based at least in part on the differential between the first voltage and the second voltage. For example, the sense amplifier may include one or more cross coupled devices configured to cause the voltage differential between the first voltage and the second voltage to resolve to either power or ground, and, thereby the sense amplifier may output a digital value, such as a zero or one corresponding to either power or ground.

Figure 3:
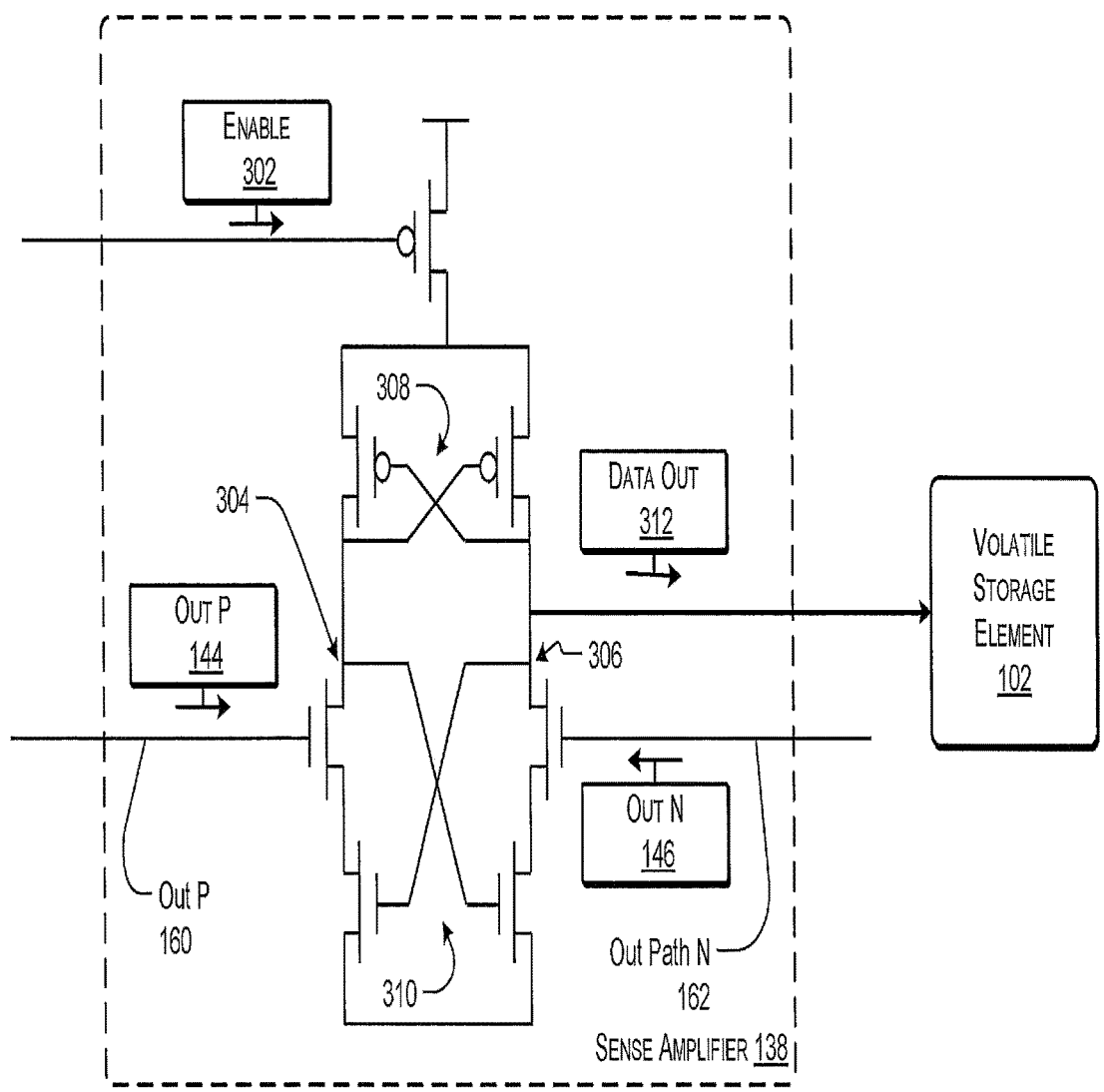
FIG. 3 illustrates a partial logic diagram and partial circuit diagram showing select components of the sense amplifier of FIG. 1 according to some implementations.

FIG. 3 illustrates a partial logic diagram and partial circuit diagram showing select components of the sense amplifier 138 of FIG. 1 according to some implementations. In general, the sense amplifier 138, in response to receiving an enable signal 302 (such as the recall signal 150 of FIG. 1), is configured to determine or detect a value stored on the bridge associated with the nonvolatile storage element of FIGS. 1 and 2 when the bridge top and bridge bottom are biased by a read bias component based at least in part on the voltage differential between the voltage associated with the out path P 144 and the out path N 146 of FIG. 1. For instance, in the illustrated example, the sense amplifier 138 receives an out P signal 144 associated with the voltage on the out path P 160 at an impedance path 304 and an out N signal 146 associated with the voltage on the out path N 162 at an impedance path 306 and based on the differential between the out P signal 144 and the out N signal 146, as will be described in more detail below, determine a digital value (e.g., zero or one) associated with nonvolatile storage element 102.

In the illustrated example, the sense amplifier 138 includes two cross coupled devices 308 and 310 coupled to the impedance paths 304 and 306. The cross coupled devices 308 and 310 are arranged such that based on the voltage differential between out P signal 144 and out N signal 146, impedance paths 304 and 306 resolve to either ground or power (e.g., zero or one). In this manner, the sense amplifier 138 may output a data out signal 312 as a digital signal of either zero or one to the volatile storage element 102 upon power up of the electronic device.

In one example, assume that out P signal 144 is higher than the out N signal 146. In this example, the voltage received at a transistor controlling the impedance path 304 is larger than the voltage received at a transistor controlling the impedance path 306 causing a voltage associated with the impedance path 304 to be pulled down further than a voltage at the impedance path 306. Thus, the voltage associated with the impedance path 304 is lower than the voltage associated with the impedance path 306. When this happens, a feedback loop associated with the cross coupled devices 308 and 310 cause the voltage associated with impedance path 304 to tend towards ground and the voltage associated with the impedance path 306 to tend towards power, which the sense amplifier 138 detects as a high signal or a one that may be output as part of data out signal 312.

In an alternative example, assume that out P signal 144 is lower than the out N signal 146. In this example, the voltage received at the transistor controlling the impedance path 304 is lower than the voltage received at the transistor controlling the impedance path 306 causing a voltage associated with the impedance path 306 to be pulled down further than a voltage at the impedance path 304. Thus, the voltage associated with the impedance path 304 is higher than the voltage associated with the impedance path 306. When this happens, the feedback loop associated with the cross coupled devices 308 and 310 cause the voltage associated with impedance path 304 to tend towards power and the voltage associated with the impedance path 306 to tend towards ground, which the sense amplifier 138 detects as a low signal or a zero that may be output as part of data out signal 312. Thus, in this manner the sense amplifier 138 is capable of translating the high and low signals stored on the MTJs of the bridge associated with the nonvolatile storage element into a digital signal that may be provided to the volatile storage element 102 when power is restored to the circuit.

The sense amplifier 138 in the illustrated example provides one possible implementation of a sense amplifier configured to sense a value (either zero or one) stored on the nonvolatile storage elements of FIGS. 1 and 2. However, it should be understood that other implementations of a sense amplifier may be utilized to sense or detect the value stored on the bridge, for instance, the sense amplifier described below with respect to FIG. 6.

Figure 4:
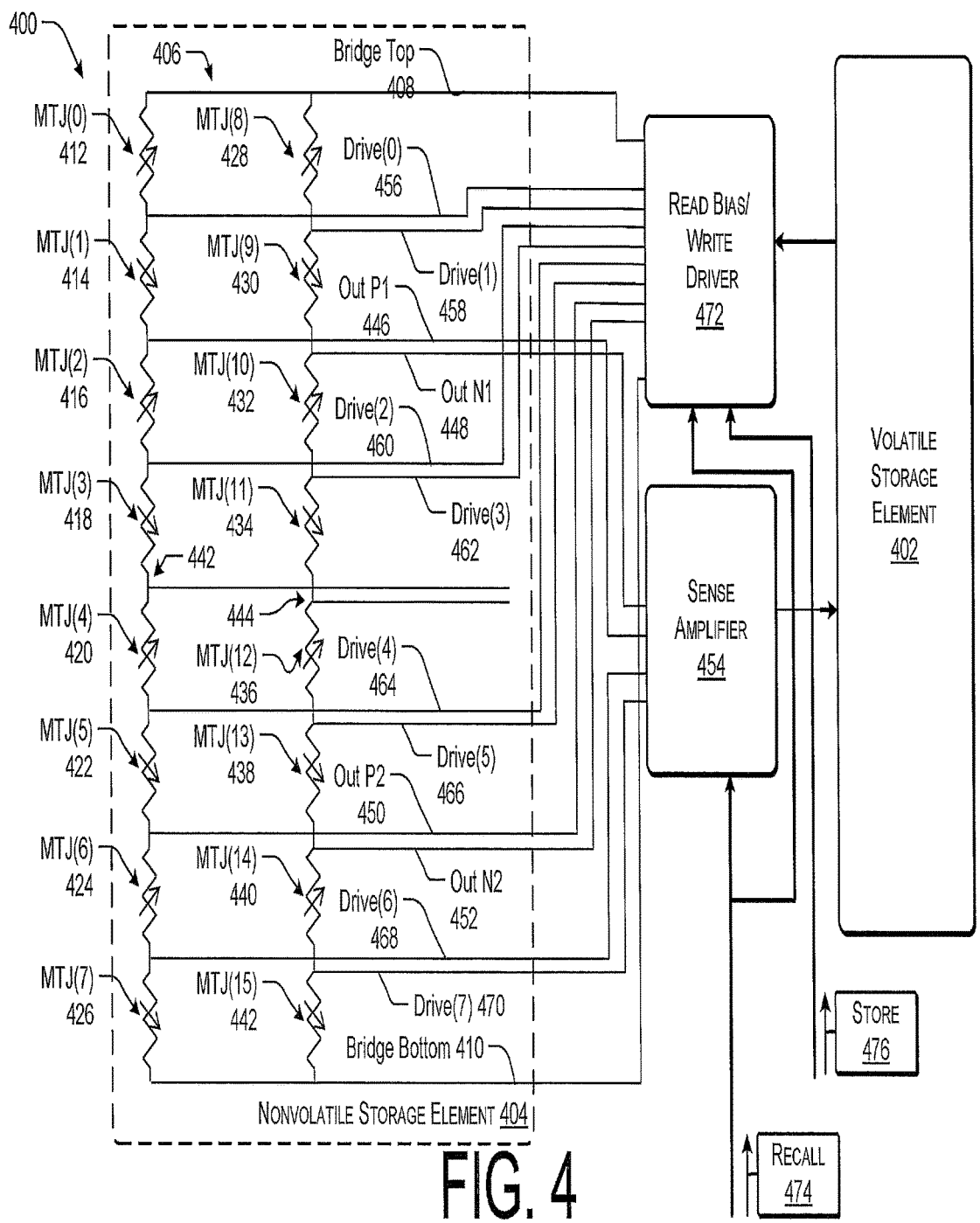
FIG. 4 illustrates a partial logic diagram and partial circuit diagram showing select components of circuit for maintaining a state through a power off period according to some implementations.

FIG. 4 illustrates a partial logic diagram and partial circuit diagram showing select components of circuit 400 for maintaining a state through a power off period according to some implementations. As described above, in the illustrated example, the circuit 400 includes a volatile storage element 402 and a nonvolatile storage element 404. In general, the volatile storage element 402 may be employed to store a state or value associated with the circuit 400, while the circuit 400 is powered on. However, in some implementations, the volatile storage element 402 may be unable to maintain the data or the state in response to the circuit 400 being powered down. Accordingly, in the event that power to the circuit 400 is reduced, such as when the circuit 400 is transitioned from an active state to a low power state or an off state, the nonvolatile storage element 404 is capable of reading the data or the state from the volatile storage element 402 and maintaining the data and/or the state until the power to the circuit 400 is reestablished.

The nonvolatile storage element 404 may include a bridge, generally indicate by 406, having a bridge top 408 and a bridge bottom 410. The bridge 406 may be formed from multiple resistive elements, such as tunnel junctions or MTJs 412-442, arranged in two columns. For instance, in the illustrated example, the bridge 406 includes a first column of the MTJs 412-426 and a second column of the MTJs 428-442. In the illustrated example, the MTJs 412-442 are arranged such that eight of the MTJs 412-418 and the MTJs 428-434 are arranged above midpoints, generally indicated by 440 and 442, associated with the bridge 406 and eight MTJs 420-426 and 436-442 are arranged below the midpoints 440 and 442.

The illustrated example, may include sixteen MTJs 412-442 instead of the eight MTJs 112-126 associated with the bridge 106 of FIG. 1, as in some electronic devices, the bias voltages and when distributed across the eights MTJs may be sufficient to disturb the resistive state associated with one or more of the eight MTJs. Therefore, in some implementations, additional MTJs may be associated with the bridge, as illustrated in the current example.

In the illustrated examples, the bridge 406 is arranged, such that a state or value may be determined from a first differential voltage associated with the top half of the bridge 406 and a second differential voltage associated with the bottom half of the bridge 406. For instance, the nonvolatile storage element 404 includes an out path P1 446 and an out path N1 448 associated with the top half of the bridge 406, as well as an out path P2 450 and an out path N2 452 associated with the bottom half of the bridge 406. In some cases, a sense amplifier 454 by be configured to detect a voltage associated with the out paths 446-452 and based on the differential values resolve the voltages to ground or power (e.g., a value of zero or one), as will be described in more detail with respect to FIG. 6 below.

In some examples, each of the MTJs 412-442 may be driven to a high state or a low state. In some implementations, a magnetic spin associated with the MTJs 412-442 may be set by driving voltages (either high or low) over drive paths 454-470. In some cases, the state of the MTJs 412-442 may be set or arranged to produce one or more particular arrangements on the bridge 406. Each of the particular arrangements results in a particular voltage differential that may be detected by the sense amplifier 454.

In one instance, a read bias/write driver 472 may receive a store signal 476 that may cause the read bias/write driver 472 to drive a high voltage over the drive paths 456, 462, 464, and 470 and a low voltage over the drive paths 458, 460, 466, and 468 for instance in order to store a value of zero. In this example, the high voltages associated with the drive paths 456, 462, 464, and 470 place and the low voltages associated with the drive paths 458, 460, 466, and 468 place the MTJs 412, 414, 420, 422, 432, 434, 440, and 442 in a high state and the MTJs 416, 418, 424, 426, 428, 430, 436, and 438 in a low state.

Alternatively the read bias/write driver 472 may receive a store signal 476, that may cause the read bias/write driver 472 to drive a low voltage over drive paths 456, 462, 464, and 470 and a high voltage over the drive paths 458, 460, 466, and 468, for instance in order to store a value of one. In this example, the low voltages associated with the drive paths 456, 462, 464, and 470 and the high voltages associated with the drive paths 458, 460, 466, and 468 place the MTJs 412, 414, 420, 422, 432, 434, 440, and 442 in a low state and the MTJs 416, 418, 424, 426, 428, 430, 436, and 438 in a high state.

In this example, by setting the MTJs 412-442 in the arrangements described above, a value may be detected by sensing the voltages associated with the out paths 446-452 when a bias is applied to the bridge top 408 and the bridge bottom 410. For instance, when power is restored to the volatile storage element 402, the sense amplifier 454 and the read bias/write driver 472 may receive the recall signal 474, and in response, the read bias/write driver 472 biases the bridge top 408 and the bridge bottom 410. Once, the bridge top 408 and the bridge bottom 410 are biased, the sense amplifier 454 is able to detect a voltage associated with the out signals 446-452 and, based on the voltages, determine the value stored on the nonvolatile storage element 404.

For instance, the sense amplifier 454 may include a pair of cross coupled devices (not shown) that are able to resolve the voltage differentials associated with the out paths 446-452 to produce a digital output that may be provided back to the volatile storage element 402. For example, in one particular instance, if the MTJs have a resistance of two when in a high state and one when in a low state and the value to be stored is a zero, then the MTJs 412, 414, 420, 422, 432, 434, 440, and 442 have a resistance of two and the MTJs 416, 418, 424, 426, 428, 430, 436, and 438 have a value of one. When the bridge top 408 and the bridge bottom 410 are biased by the read bias/write driver 472, the out path P1 446 has a voltage of $0.6\overline{6}$, the out path N1 448 has a voltage of $0.8\overline{3}$, the out path P2 450 has a voltage of $0.1\overline{6}$, and the out path N2 452 has a voltage of $0.3\overline{3}$. The voltages associated with each the out paths 446-452 may be detected by the sense amplifier 454 and the cross coupled device may cause the voltages to resolve towards ground. In response to identifying that the voltages are being resolved towards ground, the sense amplifier 454 is able to provide the value of zero back to the volatile storage element 402.

Likewise, in another particular instance, if the MTJs have a resistance of two when in a high state and one when in a low state and the value to be stored is a one, then MTJs 412, 414, 420, 422, 432, 434, 440, and 442 have a resistance of one and MTJs 416, 418, 424, 426, 428, 430, 436, and 438 have a value of two. When the bridge top 408 and the bridge bottom 410 are biased by the read bias/write driver 472, the out path P1 446 has a voltage of 0.83, the out path N1 448 has a voltage of 0.66, the out path P2 450 has a voltage of 0.33, and the out path N2 452 has a voltage of 0.16. The voltages associated with each the out paths 446-452 may be detected by the sense amplifier 454 and the cross coupled device may cause the voltages to resolve towards power. In response to identifying that the voltages are being resolved towards power, the sense amplifier 454 is able to provide the value of one back to the volatile storage element 402.

In the present example, the bridge 406 includes sixteen MTJs 412-442. However, in some implementations, the number of resistive elements or MTJs associated with the bridge 406 are related to the number of MTJs required to distribute the bias voltages between the MTJs without causing one or more of the values stored on the MTJs to be flipped or switched. Therefore, it should be understood that in other implementations the bridge 406 may have additional MTJs may be utilized to store the state of the volatile storage element 402 when the volatile storage element 402 is powered down.

Figure 5:
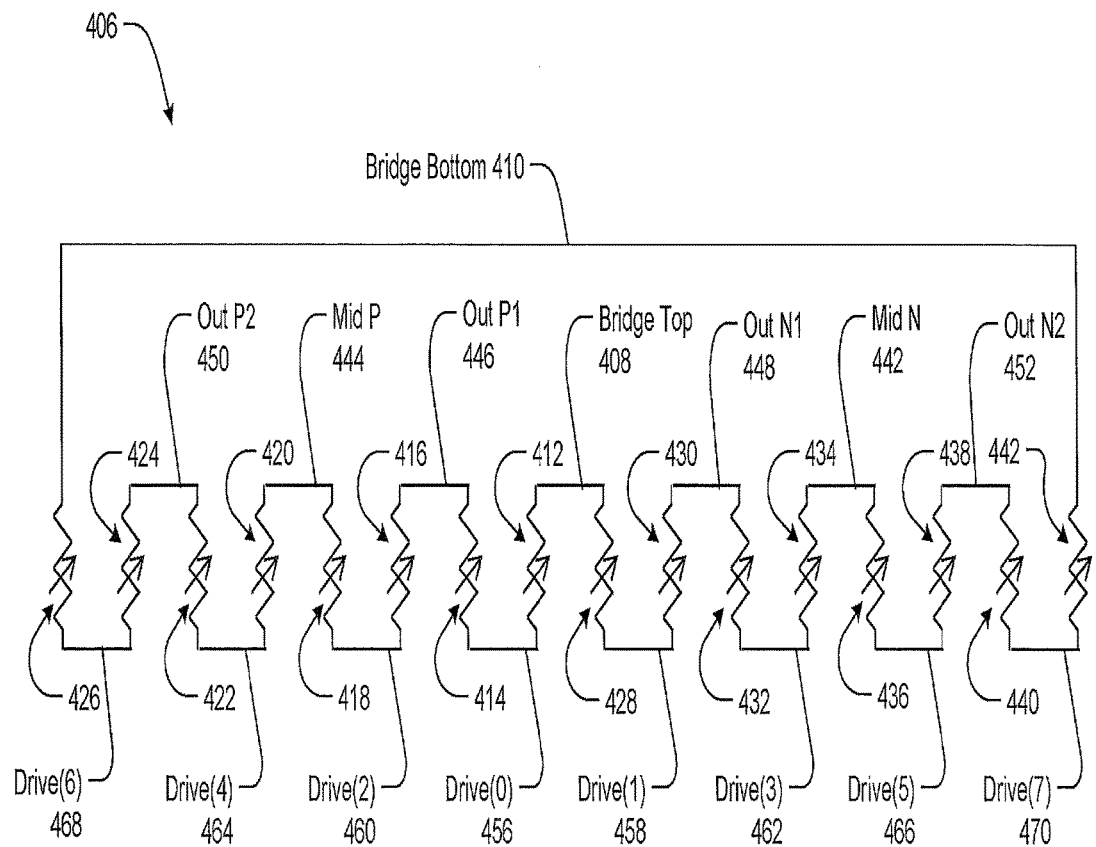
FIG. 5 illustrates a physical diagram showing select components of the bridge of FIG. 2 according to some implementations.

FIG. 5 illustrates a physical diagram showing select components of the bridge 406 of FIG. 2 according to some implementations. In the illustrated example, the MTJs 412-442 are shown along a metal layer or as part of a physical layout including the interconnections via the bridge top 408, the bridge bottom 410, the drive paths 456-470, the out path P1 446, the out path N1 448, the out path P2 450, the out path N2 452, the midpoint path P 444, and the midpoint path 442.

For instance, the MTJ 426 and the MTJ 424 are connected via the drive path 468, the MTJ 424 and the MTJ 422 are connected via the out path P2 450, the MTJ 422 and the MTJ 420 are connected via the drive path 464, the MTJ 420 and the MTJ 418 are connected via the midpoint path 440, the MTJ 418 and the MTJ 416 are connected via the drive path 460, the MTJ 416 and the MTJ 414 are connected via the out path P1 446, the MTJ 414 and the MTJ 412 are connected via drive path 456, the MTJ 412 and the MTJ 428 are connected via the bridge top 408, the MTJ 428 and the MTJ 430 are connected via drive path 458, the MTJ 430 and the MTJ 432 are connected via the out path N1 448, the MTJ 432 and the MTJ 434 are connected via drive path 462, the MTJ 434 and the MTJ 436 are connected via the midpoint path 442, the MTJ 436 and the MTJ 438 are connected via the drive path 466, the MTJ 438 and the MTJ 440 are connected via the out path N2 452, the MTJ 440 and the MTJ 442 are connected via the drive path 470, and the MTJ 442 and the MTJ 426 are connected via bridge bottom 410.

In general, when a value of zero is to be stored by the bridge 406, a write driver, such as the read bias/write driver 472 of FIG. 4, causes the drive paths 456, 462, 464, 470 to be driven high and the drive paths 458, 460, 466, and 468 to be driven low resulting in the MTJs 412, 414, 420, 422, 432, 434, 440, and 442 being placed in a high state and the MTJs 416, 418, 426, 424, 428, 430, 436, 438 being placed in a low state. In other words, when the value of zero is to be stored by the bridge 406, the drive paths 456, 462, 464, 470 are driven high, and the drive paths 458, 460, 466, and 468 are driven low thereby applying a down current along the MTJs 416, 418, 426, 424, 428, 430, 436, 438 and an up current along the MTJs 412, 414, 420, 422, 432, 434, 440, and 442.

Likewise, when a value of one is to be stored by the bridge 106 the write driver causes the drive paths 456, 462, 464, 470 to be driven low and the drive paths 458, 460, 466, and 468 to be driven high resulting in the MTJs 412, 414, 420,

422, 432, 434, 440, and 442 being placed in a low state and the MTJs 416, 418, 426, 424, 428, 430, 436, 438 being placed in a high state. In other words, when the value of one is to be stored by the bridge 406, the drive paths 456, 462, 464, 470 are driven low and the drive paths 458, 460, 466, and 468 are driven high thereby applying an up current along the MTJs 416, 418, 426, 424, 428, 430, 436, 438 and a down current along the MTJs 412, 414, 420, 422, 432, 434, 440, and 442.

In some implementations, by configuring the resistive state of the MTJs 412-442 by applying voltages to the drive paths 152-158 in the manner described above, the bridge 406 may be configured to store a value (e.g., one or zero) detectable by a sense amplifier, such as the sense amplifier describe below with respect to FIG. 6, when the bridge top 408 and the bridge bottom 410 are biased by a read bias component, such as read bias/write driver 472 of FIG. 4.

For instance, in the illustrated example, the read bias component may drive the bridge top 408 high and the bridge bottom 410 low associating a first voltage with the out path P1 446, a second voltage with the out path N1 448, a third voltage with the out path P2 450, and a fourth voltage with the out path N2 452 based on the resistive states of the MTJs 412-442, as configured in response to the write driver applying various voltages to the drive paths 456-470. In this instance, the first, second, third, and fourth voltages may be detected by one or more sense amplifiers. The sense amplifier may determine the value stored on the bridge 406 based at least in part on the differential between the first voltage, the second voltage, the third voltage, and the fourth voltage. For example, the sense amplifier may include one or more cross coupled devices configured to cause the voltage detected to resolve to either power or ground based on the voltages associated with each of the out paths 446-452, and, thereby the sense amplifier may output a digital value, such as a zero or one corresponding to either power or ground.

Figure 6:
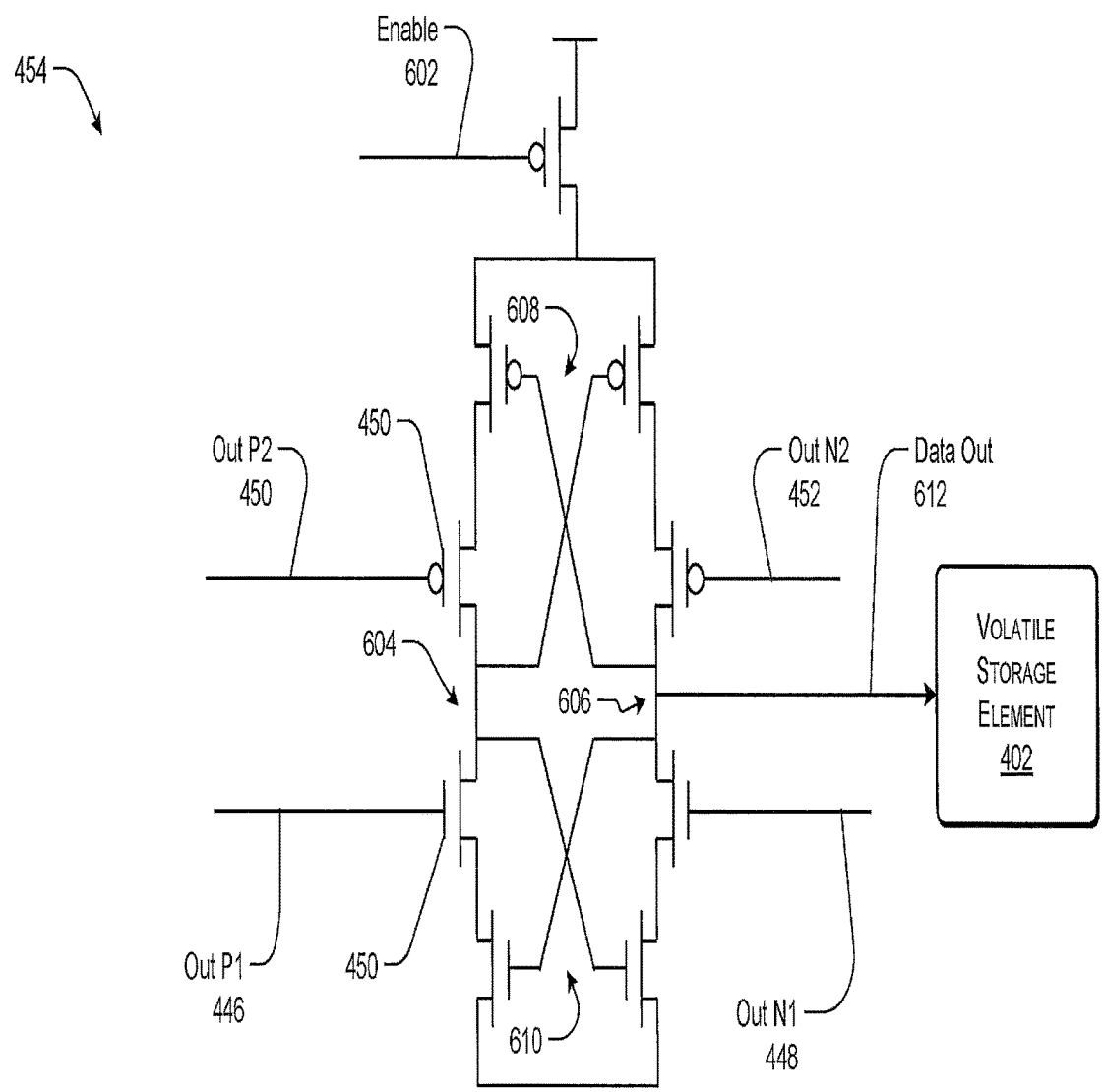
FIG. 6 illustrates a partial logic diagram and partial circuit diagram showing select components of the sense amplifier of FIG. 4 according to some implementations.

FIG. 6 illustrates a partial logic diagram and a partial circuit diagram showing select components of the sense amplifier 454 of FIG. 4 according to some implementations. In general, the sense amplifier 454, in response to receiving an enable signal (such as the recall signal 474 of FIG. 4) on the enable path 602, is configured to determine or detect a voltage differential stored on the bridge associated with the nonvolatile storage element of FIGS. 4 and 5 when the bridge top and bridge bottom are biased by a read bias component. The sense amplifier 454 identifies the value stored on the bridge based at least in part on the voltages associated with the out paths 446-452. For instance, in the illustrated example, the sense amplifier 454 receives a first voltage associated with out path P1 446 and a second voltage associated with the out path P2 450 at an impedance path 604 and a third voltage associated with out path N1 448 and a fourth voltage associated with the out path N2 452 at an impedance path 606. The sense amplifier 454 is able to resolve the voltages to either power or ground and, thereby, determine a digital value (e.g., zero or one) associated with nonvolatile storage element 402.

In the illustrated example, the sense amplifier 454 includes two cross coupled devices 608 and 610 coupled to the impedance paths 604 and 606. The cross coupled devices 608 and 610 are arranged such that based on the voltages associated with the paths 446-452, the combined voltage resolves to either ground or power (e.g., zero or one). In this manner, the sense amplifier 454 may output a value along data out path 612 to the volatile storage element 402, as a digital signal of either zero or one upon power up of the electronic device.

In one example, assume that the voltage associated with the out path P1 446 and the out path P2 450 are higher than the voltages associated with the out path N1 448 and the out path N2 452, respectively. In this example, the voltage received at a transistors controlling the impedance path 604 is larger than the voltage received at a transistors controlling the impedance path 606 causing a voltage associated with the impedance path 604 to be pulled down further than a voltage at the impedance path 606. When this happens, a feedback loop associated with the cross coupled devices 608 and 610 cause the voltage associated with the impedance path 604 to tend towards ground and the voltage associated with the impedance path 606 to tend towards power, which the sense amplifier 454 detects as a high signal or a one that may be output to the volatile storage element 402.

In an alternative example, assume that the voltage associated with the out path P1 446 and the out path P2 450 are lower than the voltages associated with the out path N1 448 and the out path N2 452, respectively. In this example, the voltage received at the transistors controlling the impedance path 604 is smaller than the voltage received at the transistors controlling the impedance path 606 causing a voltage associated with the impedance path 606 to be pulled down further than a voltage at the impedance path 604. When this happens, a feedback loop associated with the cross coupled devices 608 and 610 cause the voltage associated with the impedance path 604 to tend towards power and the voltage associated with the impedance path 606 to tend towards ground, which the sense amplifier 454 detects as a low signal or a zero that may be output to the volatile storage element 402. Thus, in this manner the sense amplifier 454 is capable of translating the high and low signals stored on the MTJs of the bridge associated with the nonvolatile storage element into a digital signal that may be provided to the volatile storage element 402 when power is restored to the circuit.

Figure 7:
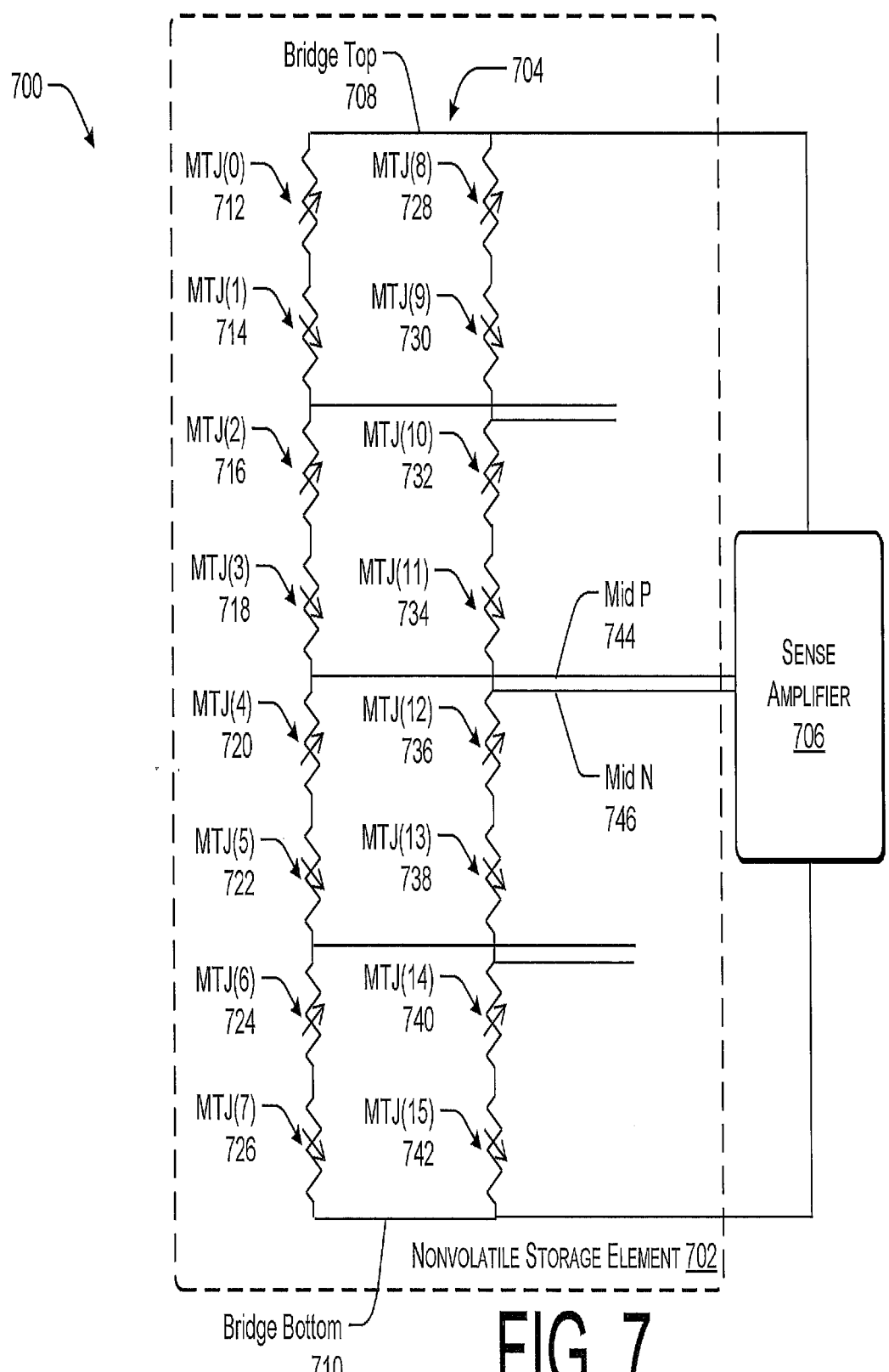
FIG. 7 illustrates a partial logic diagram and partial circuit diagram showing select components of circuit for use a physical unclonable function (PUF) according to some implementations.

FIG. 7 illustrates a partial logic diagram and a partial circuit diagram showing select components of circuit 700 for use a physical unclonable function (PUF) according to some implementations. In some cases, due to the fact that the stored magnetic orientations associated with the nonvolatile flip flop, logic gate, and/or other circuitry is difficult to detect, the nonvolatile flip flop, logic gate, and/or other circuitry may be utilized as one or more security features for a device, such as a device specific fingerprint. For instance, in some implementations, the nonvolatile flip flop, logic gate, and/or other circuitry described above with respect to FIGS. 1-6, may be used to create a PUF that may be used as a signature or fingerprint unique to each device incorporating the flip flop, logic gate, and/or other circuitry.

For instance, in the illustrated example, the circuit 700 includes a nonvolatile storage element 702 including a bridge 704 connected to a sense amplifier 706. In general, the bridge 704 has a bridge top 708 and a bridge bottom 710. The bridge 704 may be formed from multiple resistive elements, such as tunnel junctions or MTJs 712-742, arranged in two columns, as described above with respect to FIG. 4. The bridge includes a midpoint path P 744 associated with the first column and a midpoint path N 746 associated with the second column. The midpoint path P 744 is arranged such that four MTJs 712-718 are positioned above the midpoint path P 744 and four MTJs 720-726 are positioned below the midpoint path P 744. Likewise, the midpoint path N 746 is arranged such that four MTJs 728-734 are positioned above the midpoint path N 744 and four MTJs 736-742 are positioned below the midpoint path N 746.

The sense amplifier 706 is connected to both columns of the bridge 704. For instance, the sense amplifier 706 is connected to the first column via the midpoint path P 744 and the second column via the midpoint path N 746. In this manner, the sense amplifier 706 is able to detect a voltage differential between a voltage associated with the midpoint path P 744 and the midpoint path N 746, for instance as described above with respect to FIG. 3. In some cases, the transistors associated with the sense amplifier 706 may be sized to compensate variation in operation of the transistors of the sense amplifier 706 and the MTJs 712-742 as temperature and voltages fluctuate. For instance, in one particular example, the transistors of the sense amplifier 706 may be larger than the MTJs 712-742.

In general, the MTJs 712-742 may be set or configured by applying drive voltages over the bridge as discussed above with respect to FIG. 4. As discussed above, when the drive voltages are applied by a write driver the MTJs are configured such that in each column, half the MTJs are high and half of the MTJs are low. For example, in a first configurations, the MTJs 712, 714, 720, 722 in the first column may be high, while the MTJs 716, 718, 724, and 726 may be low. Likewise, in the first configuration, the MTJs 732, 734, 740, and 742 in the second column may be high, while the MTJs 728, 730, 736, and 738 may be low. Alternatively, in a second configuration, the MTJs 712, 714, 720, 722 in the first column may be low, while the MTJs 716, 718, 724, and 726 may be high. Likewise, in the second configuration, the MTJs 732, 734, 740, and 742 in the second column may be low, while the MTJs 728, 730, 736, and 738 may be high. In either configuration, if resistive state of each of the MTJs in the high state have the same resistance and each of the MTJs in the low state have the same resistance, there would be no voltage differential between the voltage associated with the midpoint path P 744 and the midpoint path N 746 and, thereby, no differential detected by the sense amplifier 706.

However, due to the natural variation in the MTJ tunnel barrier thickness and MR and, thereby, the resistance of each states of the MTJs 712-746, a voltage differential will occur between the voltage associated with the midpoint path P 744 and the voltages associated with the midpoint path N 746. The sense amplifier 706 may then resolve the differential into either a high or low state as described above with respect to FIG. 3, to generate a unique output value (e.g., either zero or one). In this manner, a random value may be generated using the bridge 704, that unless known may be difficult to detect.

In some particular examples, the voltage associated with the midpoint path P 744 and the voltage associated with the midpoint path N 746 may be so similar or equitant that sense amplifier 706 is unable to reliably detect or identify the voltage differential and, thereby is unable to reliably resolve the voltage differential associated with the bridge 704. Since the bridge 704 has two states or arrangements, when the voltage differential is unreliable in the first state, the write drive may switch the state, as in most cases the sense amplifier 706 is able to reliably detect a voltage differential between the voltages associated with the midpoint path P 744 and the midpoint path N 746 in at least one of the two states.

In some cases, by incorporating multiple circuits 700 into in a device, a PUF signature may be generated based on the natural output of high and low signals associated with each of the circuits 700. For example, a random series of bits having value of either zero or one. Further, since the PUF signature is based on a natural variation in the resistance of each state of the MTJs 712-742, the PUF signature is not easily identified or duplicated.

Figure 8:
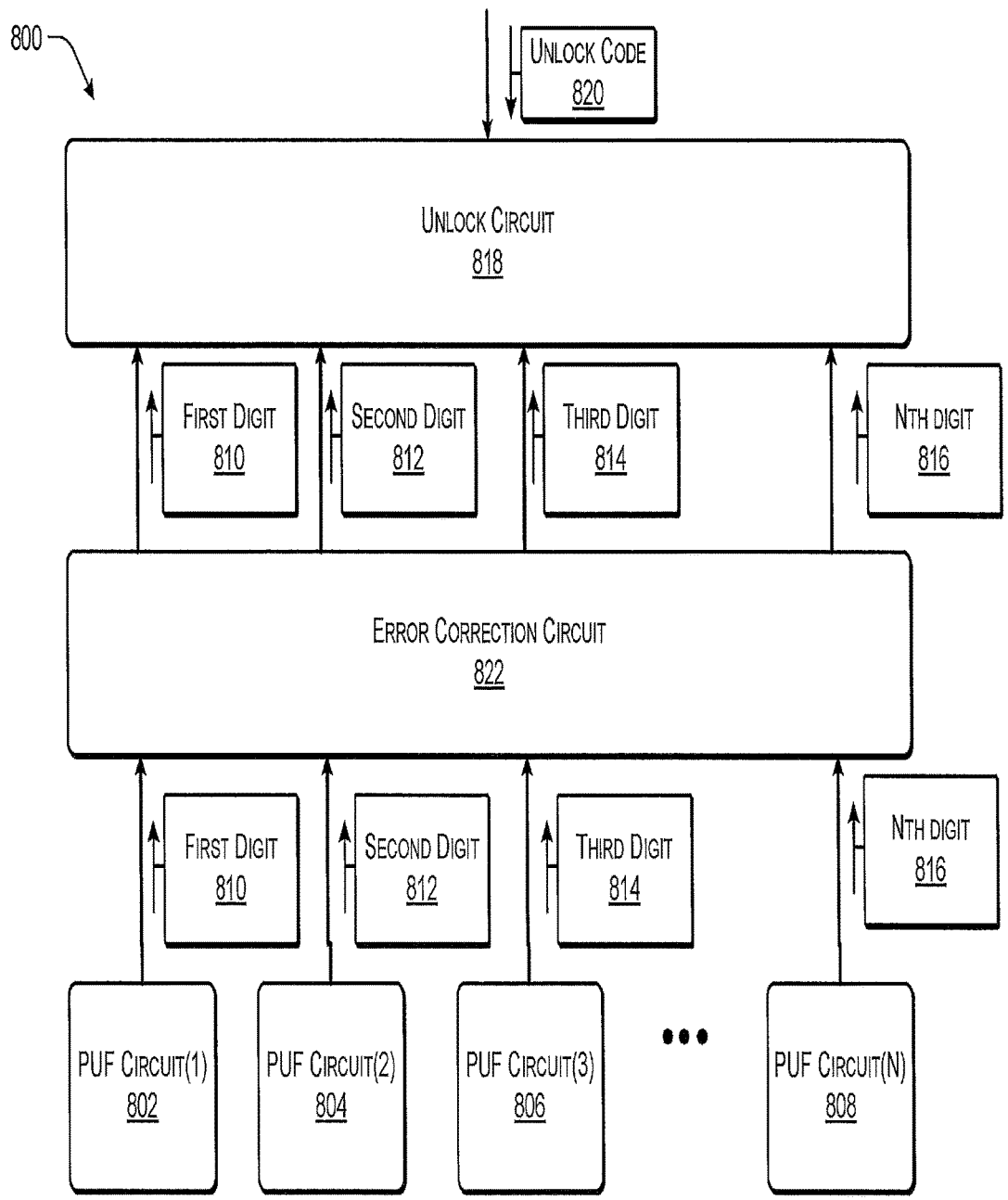
FIG. 8 illustrates a block diagram of a device utilizing a PUF as part of an unlock key according to some implementations.

FIG. 8 illustrates a block diagram of a device 800 utilizing a PUF as part of an unlock key according to some implementations. In general, the device 800 includes multiple PUF circuits 802-808 configured to produce a random value (e.g., either zero or one), as describe above with respect to FIG. 7. For example, the PUF circuit 802 may generate a first digit 810 of an unlock key for unlocking the device 800, the PUF circuit 804 may generate the second digit 812 of the unlock key, the third PUF circuit 806 may generate the third digit 814 of the unlock key, and so forth until the nth PUF circuit 808 generates the nth digit 816 of the unlock key. By generating the unlock key in this manner, the device 800 now has an identifier that was neither programmed nor alterable and, therefore, difficult to hack.

The device 800 may also include an unlock circuit 818 configured to receive an unlock code 820 as an input either from a user of the device 800 or an external source associated with the device 800. In some cases, the unlock circuit 818 is configured to compare the unlock code 820 to the unlock key generated based on the digits 810-816. In other cases, the unlock circuit 818 may unlock when a predetermined percentage of the digits of the unlock code match the digits 810-816, for instance in cases that the resistive state of the MTJs in the PUF circuits 802-808 vary sufficiently as the temperature fluctuates and causes erroneous reads on some of the MTJs.

Since each of the PUF circuits 802-808 include a bridge of MTJs that have two states (e.g., high and low), in some particular examples, the unlock key formed from the digits 810-816 may be variable. For instance, a write driver may flip the state of the bridge associated with selected PUF circuits 802-808 after each successful code 820 entry, such that the unlock key formed from the digits 810-816 changes in a pattern known to owner of the device after each use. In other examples, the write driver may flip the state of the bridge associated with the selected PUF circuits 802-808 based on a length of time, a number of correct key entries, the time of day, among others. In these examples, the user may be supplied with a key timer that provides them with the correct unlock code 820 during the associated period of time.

In some instance, such as the illustrated example, each of the PUFs circuits 802-808 may be associated with an ECC circuit 822 to improve the overall reliability of the PUFs circuits 802-808. For example, in some cases the state of one or more of the MTJs associated with the PUFs circuit 802-808 may be disturbed. When this happens, the digits 810-816 output by one or more of the PUFs circuits 802-808 may be erroneous, however, by utilizing the ECC circuit some of the erroneous reads may be corrected before the unlock key is compared with the unlock code 820, thereby improving the reliability of the PUFs circuits 802-808. The ECC circuit 822 may receive parity bit information stored in additional nonvolatile elements (not shown), such as nonvolatile storage element 104 of FIG. 1 or nonvolatile storage element 404 of FIG. 4. Alternately, the parity bit information may be stored as the state associated with one or more of the PUF circuits 802-808.

Figure 9:
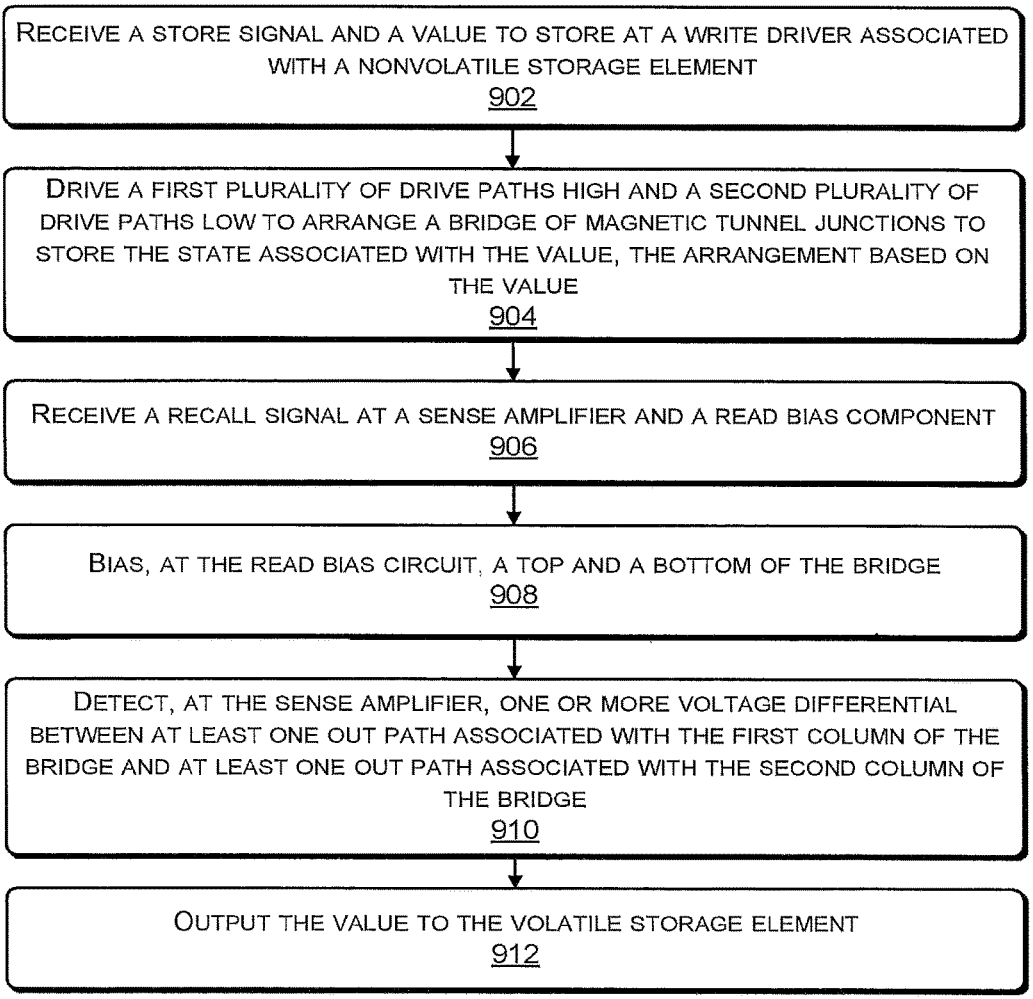
FIG. 9 illustrates an example flow diagram showing an illustrative process for maintaining a state associated with a nonvolatile storage element through a powered down period according to some implementations.
Figure 10:
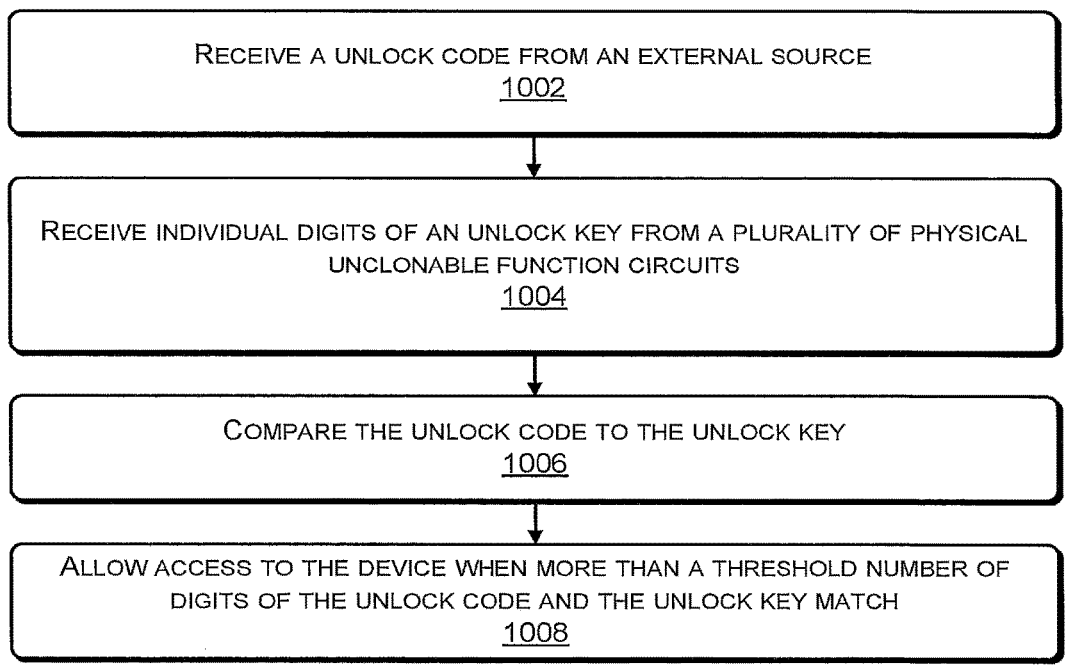
FIG. 10 illustrates an example flow diagram showing an illustrative process for utilizing a nonvolatile storage element as a PUF according to some implementations.

FIGS. 9 and 10 are flow diagrams illustrating example processes of nonvolatile logic gates used for storing a state and/or as a PUF circuit. The processes are illustrated as a collection of blocks in a logical flow diagram, which represent a sequence of operations, some or all of which can be implemented in hardware, software or a combination thereof. In the context of software, the blocks represent computer-executable instructions stored on one or more computer-readable media that, which when executed by one or more processors, perform the recited operations. Generally, computer-executable instructions include routines, programs, objects, components, data structures and the like that perform particular functions or implement particular abstract data types.

The order in which the operations are described should not be construed as a limitation. Any number of the described blocks can be combined in any order and/or in parallel to implement the process, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

FIG. 9 illustrates an example flow diagram showing an illustrative process 900 for maintaining a state associated with a nonvolatile storage element, such as the nonvolatile storage elements 104 and 404 of FIGS. 1 and 4, through a powered down period according to some implementations. For example, MRAM or ST-MRAM elements may be utilized to generate nonvolatile flip flops, nonvolatile logic gates, and/or other nonvolatile circuits for maintaining a state while a device or portion of a device is powered off, as described above with respect to FIGS. 1-6.

At 902, a write driver associated with the nonvolatile storage element receives a store signal and a value (e.g., zero or one) to maintain through a powered down period. For instance, the write driver may receive the store signal and the value from a voltage storage element and/or from another element associated with the circuit incorporating the nonvolatile storage element and the volatile storage element.

At 904, the write driver drives a first plurality of drive paths high and a second plurality of drive paths low to arrange a bridge of MTJs associated with the nonvolatile storage element to store a state associated with the value. In some cases, the write driver selects the drive paths to drive high and the drive paths to drive low based at least in part on the value to be stored. For example, as described above, if the bridge includes two columns of four MTJs and the value to be stored is a zero, the write drive may drive the paths high and low in order to arrange the first column of MTJs from the bridge top to the bridge bottom as high, high, low, low, high, high, low, low and the second column of MTJs from the bridge top to the bridge bottom as low, low, high, high, low, low, high, high. Alternatively if the value to be stored is a one, the write drive may drive the paths high and low in order to arrange the first column of MTJs from the bridge top to the bridge bottom as low, low, high, high, low, low, high, high and the second column of MTJs from the bridge top to the bridge bottom as high, high, low, low, high, high, low, low.

At 906, a sense amplifier and a read bias component receive a recall signal. For instance, the recall signal may be triggered in response to detecting that the volatile storage element has power once more. In other instances, the recall signal may be received from various other elements of the circuit incorporating the nonvolatile storage element and the volatile storage element.

At 908, a read bias component may bias the top of the bridge and the bottom of the bridge. For example, the bias circuit may drive the bridge top high and the bridge bottom low in order to create one or more voltage differentials along the bridge.

At 910, the sense amplifier detects one or more voltage differentials between at least one out path associated with the first column of the bridge and at least one out path associated with the second column of the bridge. For example, the sense amplifier may have one or more cross coupled devices that cause the voltages associated with out paths to resolve to either power or ground (e.g., one or zero).

At 912, the sense amplifier outputs the value to the volatile storage element. For example, if the voltages had resolved to power, the sense amplifier may output a digital value, such as a one. Likewise, if the voltages had resolved to ground, the sense amplifier may output a digital value, such as zero. Thus, by utilizing a nonvolatile storage element including a bridge formed from MTJs which may be configured by the write driver, a state or value may be stored through a low power or powered off period.

FIG. 10 illustrates an example flow diagram showing an illustrative process 1000 for utilizing a nonvolatile storage element as a PUF according to some implementations. For instance, due to the fact that the stored magnetic orientations associated with the nonvolatile storage elements described herein are difficult to detect, the nonvolatile storage elements may be utilized as one or more security features, in some implementations. For example, the nonvolatile storage elements may be used to create PUF circuits that may be used in combination to generate a device signature, fingerprint, or unlock code that is hard to detect, difficult to alterable, and unique to each device. In some specific implementations, an error correction code (ECC) circuit may be used in conjunction with the PUF circuit to improve the consistency of the output response and, thereby, the overall reliability of the PUF circuit.

At 1002, an unlock circuit, such as the unlock circuit 818 of FIG. 8, receives a unlock code from another circuit or a user associated with the device. For instance, a user of a device may enter an unlock code before the device allows the user to access at least a portion of the features associated with the device.

At 1004, the unlock circuit receives individual digits of an unlock key from a plurality of PUF circuits. For example, each of the PUF circuits, described above with respect to FIG. 8, are capable of generating a high or low voltage that is detectable and interpreted by a sense amplifier as a zero or one. Since the voltage either high or low is dependent on the natural variations within the MTJs that form the PUF circuits, the value either zero or one is random, hard to alter, and difficult to detect. In this example, the unlock circuit receives different digits of the unlock key from each of the PUFs circuits and, thereby a random key that is unique to the device.

At 1006, the unlock circuit compares the unlock code to the unlock key and, at 1008, the unlock circuit allows access to the device when more than a threshold number of digits of the unlock code and the unlock key match. In some cases, the threshold may be one hundred percent of the digits match or an exact match between the unlock key and the unlock code. In other examples, a smaller percent such as ninety five percent, may need to match before the unlock circuit allows access to the device, as in some cases variations in temperature and/or voltage may cause one or more of the PUF circuits to generate an unexpected value. In some particular instances, the unlock circuit may receive the unlock code from the external source and multiple versions of the unlock key from the PUF circuits and unlock if the unlock code matches above a second threshold number of the unlock keys.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
a first circuit having a first column of resistive elements and a second column of resistive elements, the second column having a same number of resistive elements as the first column, the first column of resistive elements having a first node at a first midpoint and the second column of resistive elements having a second node at a second midpoint, a first sense amplifier configured to determine a first voltage differential between the first node and the second node, and wherein the first circuit is configured to generate a first digit of an unlock key based on a first resistive state of the first circuit, the first resistive state based on the first voltage differential;
a second circuit having a third column of resistive elements and a fourth column of resistive elements, the third column having a same number of resistive elements as the fourth column, the third column of resistive elements having a third node at a third midpoint and the fourth column of resistive elements having a fourth node at a fourth midpoint, a second sense amplifier configured to determine a second voltage differential between the first node and the second node, and wherein the second circuit is configured to generate a second digit of the unlock key based on a second resistive state of the second circuit, the second resistive state based on the second voltage differential; and
an unlock circuit associated with a device, wherein the unlock circuit is configured to compare an unlock code with the first digit of the unlock key and the second digit of the unlock key, and wherein the unlock circuit allows access to the device when a threshold percentage of the unlock code matches the first digit and the second digit.

2. The system as recited in claim 1, wherein:
the first circuit comprises a read bias component;
a bridge top coupled to a first resistive element of the first column and a first resistive element of the second column, the bridge top configured to receive a first bias voltage from the read bias component;
a bridge bottom coupled to a second resistive element of the first column and a second resistive element of the second column, the bridge bottom configured to receive a second bias voltage from the read bias component;
the first midpoint is between first and second pluralities of resistive elements of the first column; and
the second midpoint is between first and second pluralities of resistive elements of the second column.

3. The system as recited in claim 1, wherein the resistive elements are magnetic tunnel junctions.

4. A system comprising:
a first circuit having a first column of resistive elements and a second column of resistive elements, the second column having a same number of resistive elements as the first column, the first column of resistive elements having a first node at a first midpoint and the second column of resistive elements having a second node at a second midpoint, a first sense amplifier configured to determine a first voltage differential between the first node and the second node, and wherein the first circuit is configured to generate a first digit of an unlock key based on a first resistive state of the first circuit, the first resistive state based on the first voltage differential;
a second circuit having a third column of resistive elements and a fourth column of resistive elements, the third column having a same number of resistive elements as the fourth column, the third column of resistive elements having a third node at a third midpoint and the fourth column of resistive elements having a fourth node at a fourth midpoint, a second sense amplifier configured to determine a second voltage differential between the first node and the second node, and wherein the second circuit is configured to generate a second digit of the unlock key based on a second resistive state of the second circuit, the second resistive state based on the second voltage differential;
an error correction circuit configured to receive the first digit and the second digit to correct at least one error associated with the first digit and the second digit of the unlock key; and
an unlock circuit associated with a device, wherein the unlock circuit is configured to compare an unlock code with the first digit and the second digit of the unlock key, and wherein the unlock circuit allows access to the device when a threshold percentage of the unlock code matches the first digit and the second digit of the unlock key.

5. The system as recited in claim 4, wherein:
the first circuit comprises a read bias component;
a bridge top coupled to a first resistive element of the first column and a first resistive element of the second column, the bridge top configured to receive a first bias voltage from the read bias component;
a bridge bottom coupled to a second resistive element of the first column and a second resistive element of the second column, the bridge bottom configured to receive a second bias voltage from the read bias component;
the first midpoint is between first and second pluralities of resistive elements of the first column; and
the second midpoint is between first and second pluralities of resistive elements of the second column.

6. The system as recited in claim 4, wherein the resistive elements are magnetic tunnel junctions.

7. A system comprising:
a first circuit having a first write driver configured to place a first column of resistive elements and a second column of resistive elements in a first resistive state, the second column having a same number of resistive elements as the first column, the first column of resistive elements having a first node at a first midpoint and the second column of resistive elements having a second node at a second midpoint, a first sense amplifier configured to determine a first voltage differential between the first node and the second node, and wherein the first circuit is configured to generate a first digit of an unlock key based on the first resistive state of the first circuit, the first resistive state based on the first voltage differential;
a second circuit having a second write driver configured to place a third column of resistive elements and a fourth column of resistive elements in a second resistive state, the third column having a same number of resistive elements as the fourth column, the third column of resistive elements having a third node at a third midpoint and the fourth column of resistive elements having a fourth node at a fourth midpoint, a second sense amplifier configured to determine a second voltage differential between the first node and the second node, and wherein the second circuit is configured to generate a second digit of the unlock key based on the second resistive state of the second circuit, the second resistive state based on the second voltage differential; and an unlock circuit associated with a device, wherein the unlock circuit is configured to compare an unlock code with the first digit and the second digit of the unlock key, and wherein the unlock circuit allows access to the device when a threshold percentage of the unlock code matches the first digit and the second digit of the unlock key.

8. The system as recited in claim 7, wherein the first write driver is configured to place the first column of resistive elements and the second column of resistive elements in a third resistive state when the threshold percentage is not reached.

9. The system as recited in claim 7, wherein the resistive elements are magnetic tunnel junctions.

10. The system as recited in claim 1, wherein a first write driver is configured to place the first column of resistive elements and second column of resistive elements in a third resistive state when the threshold percentage is not reached.

11. The system as recited in claim 4, wherein a first write driver is configured to place the first column of resistive elements and second column of resistive elements in a third resistive state when the threshold percentage is not reached.

* * * * *